(12) United States Patent
Deshpande et al.

(10) Patent No.: US 12,430,041 B1
(45) Date of Patent: Sep. 30, 2025

(54) PERFORMANCE-BASED MIGRATION FOR A VOLUME GROUP

(71) Applicant: International Business Machines Corporation, Armonk, NY (US)

(72) Inventors: Umesh Deshpande, San Jose, CA (US); Binayak Dutta, Pune (IN); Thanh T. Pham, San Jose, CA (US); Sangeetha Seshadri, Plano, CA (US); Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/659,921

(22) Filed: May 9, 2024

(51) Int. Cl.
    *G06F 3/06* (2006.01)
    *G06F 11/34* (2006.01)

(52) U.S. Cl.
    CPC .......... *G06F 3/0619* (2013.01); *G06F 3/0634* (2013.01); *G06F 3/067* (2013.01); *G06F 11/3428* (2013.01)

(58) Field of Classification Search
    CPC .. G06F 3/0619; G06F 11/3428; G06F 3/0634; G06F 3/067
    See application file for complete search history.

(56) References Cited

U.S. PATENT DOCUMENTS

| | | |
|---|---|---|
| 9,503,517 B1 | 11/2016 | Brooker et al. |
| 10,353,634 B1 | 7/2019 | Greenwood et al. |
| 11,307,885 B1 | 4/2022 | Luciano et al. |
| 11,327,688 B2 | 5/2022 | Tornow et al. |
| 11,340,939 B1 | 5/2022 | Barker, Jr. et al. |
| 11,567,810 B1 * | 1/2023 | Kenney ............... G06F 12/0246 |
| 12,007,893 B1 * | 6/2024 | Kim .................... G06F 12/0871 |
| 2016/0306727 A1 * | 10/2016 | Kato ................... G06F 11/3447 |
| 2021/0073114 A1 * | 3/2021 | Haubold .............. G06F 9/5011 |
| 2022/0283717 A1 | 9/2022 | Singh et al. |
| 2022/0414577 A1 | 12/2022 | Patel et al. |

OTHER PUBLICATIONS

Yao et al., "Multi-Dimensional Scheduling in Cloud Storage Systems," IEEE International Conference on Communications (ICC), 2015, 6 pages, retrieved from https://ieeexplore.ieee.org/document/7248353.

(Continued)

*Primary Examiner* — Mark A Giardino, Jr.
(74) *Attorney, Agent, or Firm* — Zilka-Kotab, P.C.

(57) ABSTRACT

A computer-implemented method (CIM), according to one embodiment, includes simulating placement of a volume group on a first potential target storage system, and determining a first performance limit for the first potential target storage system based on the simulating. The method further includes predicting a duration the first potential target storage system can host the volume group without performance degradation, based on the first performance limit, and outputting a notification to a customer device, where the notification includes an indication of the predicted duration. A computer program product (CPP), according to another embodiment, includes a set of one or more computer-readable storage media, and program instructions, collectively stored in the set of one or more storage media, for causing a processor set to perform the foregoing method.

20 Claims, 6 Drawing Sheets

(56) References Cited

OTHER PUBLICATIONS

Yao et al., "SLA-aware Resource Scheduling for Cloud Storage," IEEE 3rd International Conference on Cloud Networking (CloudNet), 2014, 6 pages, retrieved from https://ieeexplore.ieee.org/document/6968962.

IBM, "Volume groups," IBM Documentation, Mar. 24, 2023, 2 pages, retrieved from https://www.ibm.com/docs/en/aix/7.2?topic=concepts-volume-groups.

Abrol, F., "Pure1 Meta: Introducing Workload Simulations," Pure Storage, Aug. 5, 2019, 10 pages, retrieved from https://blog.purestorage.com/products/pure1-meta-workload-simulations/.

Zito, C., "HPE InfoSight overview demo," Hewlett Packard Enterprise, Mar. 22, 2018, 4 pages, retrieved from https://community.hpe.com/t5/around-the-storage-block/hpe-infosight-overview-demo/ba-p/7000493.

Zito, C., "Two more HPE InfoSight demos," Hewlett Packard Enterprise, Apr. 6, 2018, 4 pages, retrieved from https://community.hpe.com/t5/around-the-storage-block/two-more-hpe-infosight-demos/ba-p/7001554.

Nicholson, E., "New HPE InfoSight Demo—the basics, the new look, latest updates," Hewlett Packard Enterprise, Feb. 19, 2021, 2 pages, retrieved from https://community.hpe.com/t5/infosight-predictive-analytics/new-hpe-infosight-demo-the-basics-the-new-look-latest-updates/td-p/7121925.

HPE, "HPE InfoSight," Hewlett Packard Enterprise, 2024, 10 pages, retrieved from https://www.hpe.com/us/en/software/infosight.html.

HPE, "Predict and Prevent Downtime With Aiops," Hewlett Packard Enterprise, 2021, 1 page, retrieved from https://www.hpe.com/psnow/doc/a50004218enw?jumpid=in_pdfviewer-psnow.

HPE, "HPE InfoSight for Servers," Hewlett Packard Enterprise, QuickSpecs, Version 4, Jan. 8, 2024, 9 pages, retrieved from https://www.hpe.com/psnow/doc/a50002548enw?jumpid=in_hpesitesearch.

* cited by examiner

US 12,430,041 B1

PERFORMANCE-BASED MIGRATION FOR A VOLUME GROUP

BACKGROUND

The present invention relates to data storage environments, and more specifically, this invention relates to migration of volume groups.

A volume group is defined as a collection of one or more physical volumes of data. These physical volumes of data may be of varying size and types. Within a data storage environment that includes a plurality of data storage systems, volume groups are migrated across the data storage systems for a number of different reasons. For example, in some cases, volume groups are migrated across the data storage systems in order to balance a load across the existing data storage systems. Volume groups may additionally and/or alternatively be migrated across the data storage systems in order to offload a data storage system by consolidating the workloads to relatively fewer data storage systems. In yet another example, volume groups are migrated across the data storage systems in response to the addition of a new storage system in the data storage environment.

SUMMARY

A computer-implemented method (CIM), according to one embodiment, includes simulating placement of a volume group on a first potential target storage system, and determining a first performance limit for the first potential target storage system based on the simulating. The method further includes predicting a duration the first potential target storage system can host the volume group without performance degradation, based on the first performance limit, and outputting a notification to a customer device, where the notification includes an indication of the predicted duration.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
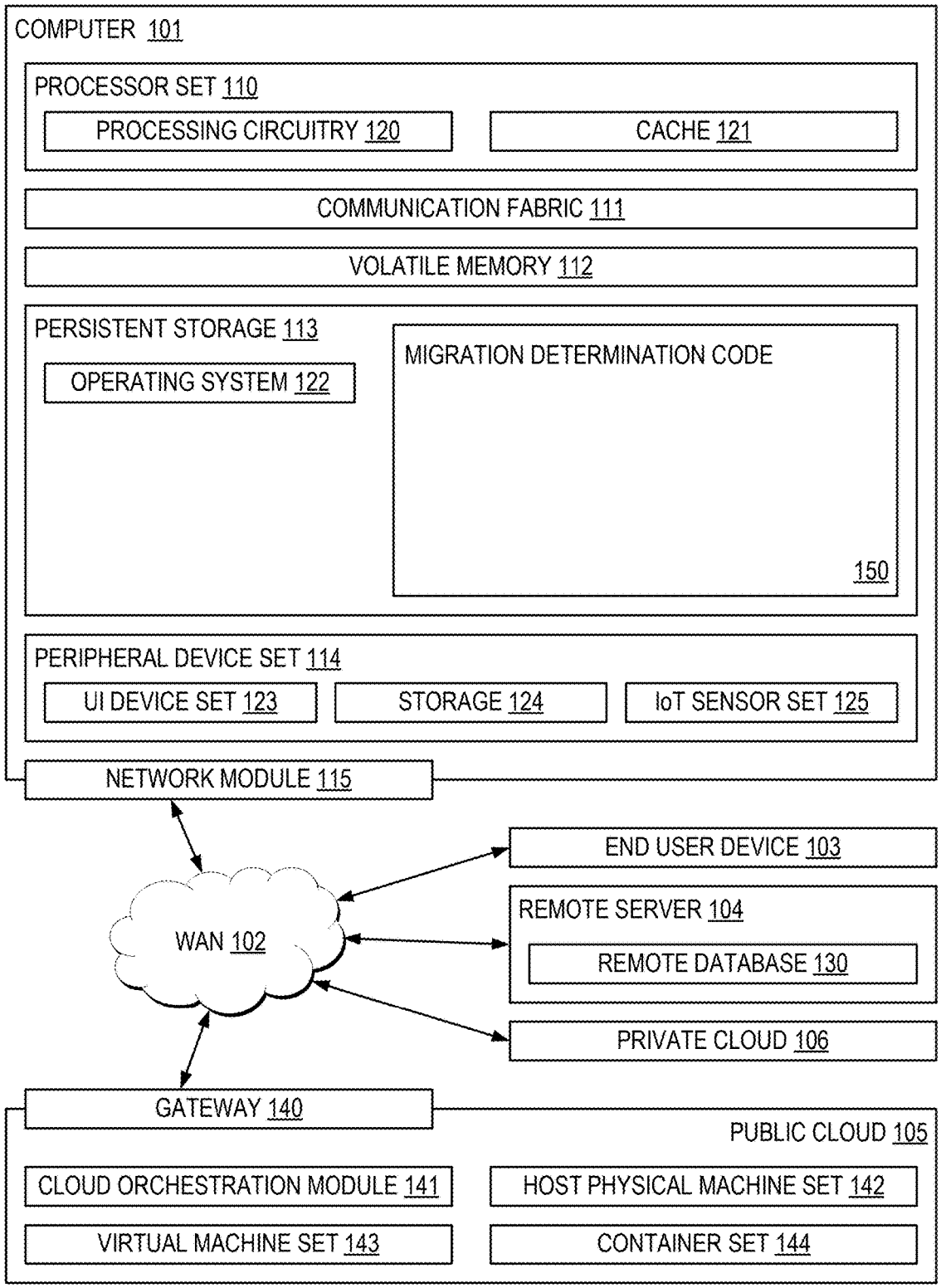
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performance-based migration for a volume group.

In one general embodiment, a CIM includes simulating placement of a volume group on a first potential target storage system, and determining a first performance limit for the first potential target storage system based on the simulating. The method further includes predicting a duration the first potential target storage system can host the volume group without performance degradation, based on the first performance limit, and outputting a notification to a customer device, where the notification includes an indication of the predicted duration.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as migration determination code of block 150 for performance-based migration for a volume group. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
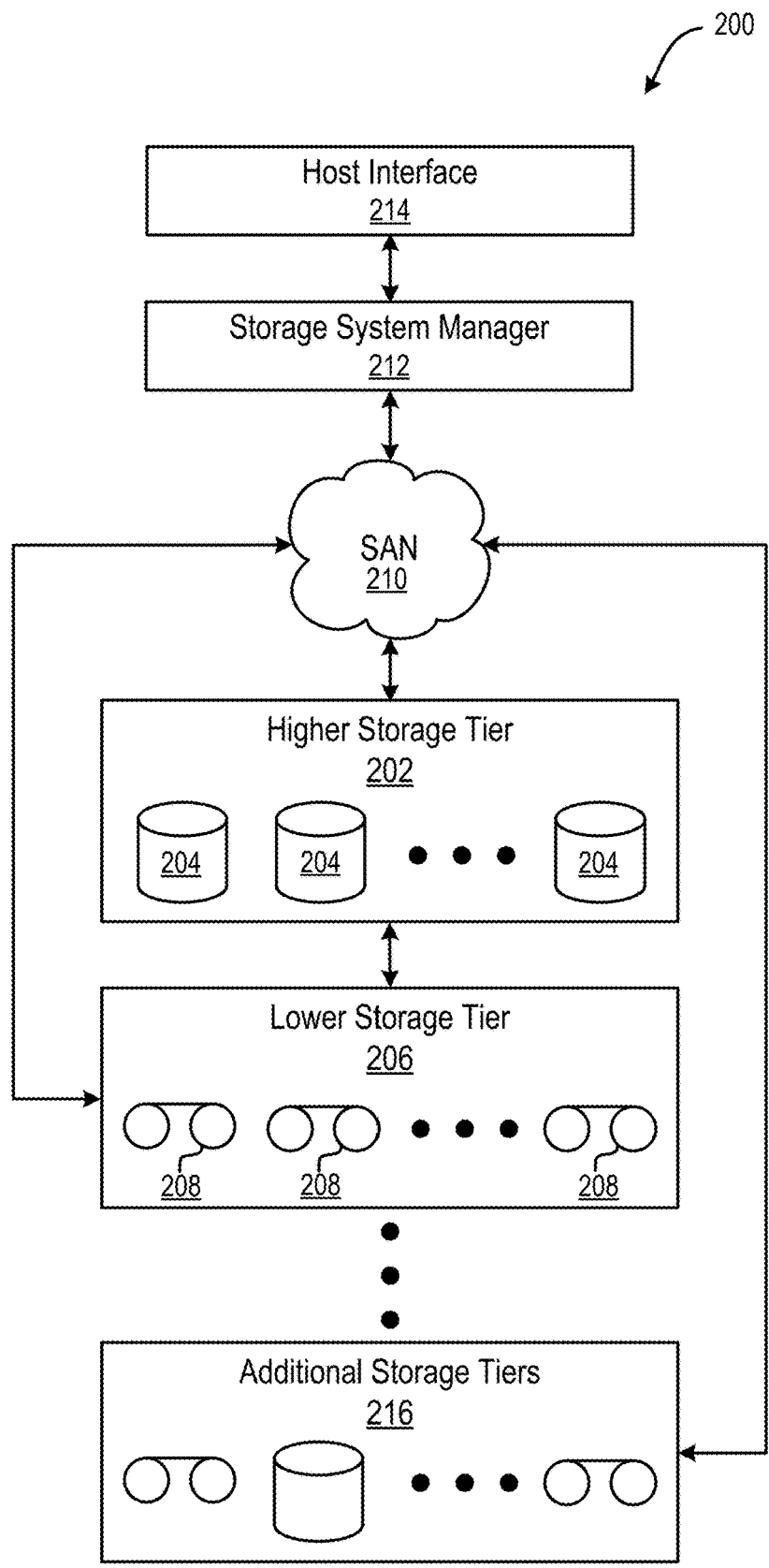
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, a volume group is defined as a collection of one or more physical volumes of data. These physical volumes of data may be of varying size and types. In some illustrative infrastructures, a relatively larger volume group may include from one to hundreds of physical volumes or more. Meanwhile, a scalable volume group may include up to any number of physical volumes, e.g., up to 1024 or more. A physical volume may belong to only one volume group per data storage system, in some approaches. When a physical volume is assigned to a volume group, the physical blocks of storage media on it are organized into physical partitions of a size that is specified upon creating the volume group.

Within a data storage environment that includes a plurality of data storage systems, volume groups are migrated across the data storage systems for a number of different reasons. For example, in some cases, volume groups are migrated across the data storage systems in order to balance a load across the existing data storage systems. Volume groups may additionally and/or alternatively be migrated across the data storage systems in order to offload a data storage system by consolidating the workloads to relatively fewer data storage systems. In yet another example, volume groups are migrated across the data storage systems in response to the addition of a new storage system in the data storage environment.

Several issues (with respect to inefficiencies and additional latency) may arise as a result of migrating volume groups across data storage systems. In some use cases, these issues arise based on the migrations performed across data storage systems of a data storage environment being performed without knowledge of how to size a new data storage system to host some of the running volume groups. Furthermore, in some other use cases these issues arise based on the migrations performed across data storage systems of the data storage environment being performed without knowledge of how long of a duration a data storage system should host a given volume group. These issues create challenges with respect to a volume group's performance requirements potentially not being met by a data storage system that hosts the volume group. Furthermore, conventional migration across data storage systems is performed without knowing the respective performance limits of different data storage systems, e.g., storage capacity, performance capacity, etc. These issues are, at least in part, based on the fact that unlike storage capacity, performance requirements (for a volume group) and limits (for a data storage system) cannot be expressed in a unidimensional scale. In summary, the issues described above demonstrate that there is a longstanding need within the technical field of data storage for migration techniques that mitigate performance inefficiencies within a data storage environment during migrations of volume groups.

In sharp contrast to the deficiencies of the conventional approaches described above, the techniques of embodiments and approaches described herein determine efficient placements of volume groups within a data storage environment before actually performing migrations of such volume groups. More specifically, these techniques include simulating the placement of volume group on a potential target system (also referred to as a "host data storage system" based on the simulated placement), finding a storage system performance limit for the simulated placement, and then projecting performance of the host data storage system for a duration of the placement. This way, relatively inefficient placements (placements that would otherwise incur relatively reduced performance) are avoided in the simulation phase, while relatively efficient placements (placements that are determined during the simulation to be capable of causing relatively increased performance) are suggested and/or pursued.

Figure 3:
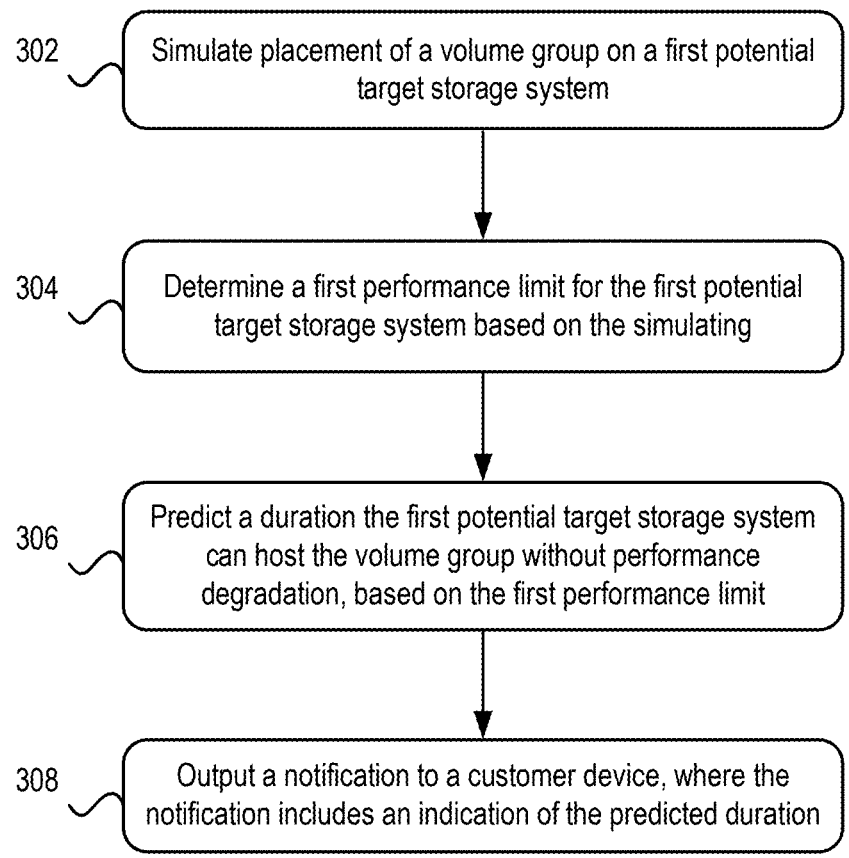
FIG. 3 is a flowchart of a method, in accordance with one embodiment of the present invention.

Now referring to FIG. 3, a flowchart of a method 300 is shown according to one embodiment. The method 300 may be performed in accordance with aspects of the present invention in any of the environments depicted in FIGS. 1-6, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It should be prefaced that method 300 includes techniques for optimizing a volume group across a plurality of storage systems. Method 300 may be performed for volume groups, where each volume group preferably include one or more data volumes. These data volumes may, in some approaches, be of a different size and/or type. In an alternate approach, the method may be performed for a collection of volumes of the same type and/or size. Furthermore, method 300 is preferably performed in a data storage environment that includes at least two data storage systems. When considering a migration of a volume group within the data storage environment, these two or more data storage systems are potential target storage systems, e.g., a first potential target storage system, a second potential target storage system, etc., that are considered for hosting a volume group. This way, a migration of a data volume between volume groups is ensured to enable operational efficiencies with respect to other available migrations, e.g., a relatively least amount of latency, fulfillment of customer requirements of a given volume group and/or data volume thereof, etc. It should also be noted that, although various operations are described herein with respect to a volume group on a first potential target storage system, the operations of method 300 may be performed for a plurality of volume groups (concurrently or sequentially) and/or with respect placements on a plurality of potential target storage systems.

An infrastructure that method 300 may be performed with respect to, in some approaches, includes a cloud based storage environment in which each of the target storage systems are located at different geographical locations. In some other approaches, the infrastructure may additionally and/or alternatively include an on-premises infrastructure that includes a plurality of data storage racks. Volume groups may be migrated between different potential target storage systems of the data storage racks, e.g., where each of the different potential target storage systems are a unique storage nodes of the data storage racks that act as a unique target storage system. For example, these storage nodes of the data storage racks may act as a unique target storage system based on each of the nodes having associated storage and being configured to fulfill I/O requests for data stored on storage of the node.

Method 300 preferably includes simulating the placement of a volume group on a potential target system in order to generate a combined I/O profile (described in further detail below in another step of method 300). For example, operation 302 includes simulating placement of a volume group on a first potential target storage system. For context, the simulation is performed in order to determine, without incurring the overhead of actually placing the volume on the first potential target storage system, what could be expected if the volume were actually placed on the first potential target storage system.

In some preferred approaches, simulating the placement of the volume group on the first potential target system includes obtaining performance metrics for each of the volumes of the volume group. In order to obtain these performance metrics, in some approaches, method 300 includes causing, e.g., instructing, one or more of the potential target storage systems of the data storage environment (preferably including the first potential storage system) to generate and provide performance metrics for each of the volumes.

The type(s) of performance metric(s) that are generated for the volumes may depend on the approach. In some approaches, the performance metrics include timestamps, e.g., a timestamp of each interval of sampling in which the performance metrics are obtained, a timestamp that detail the initiation time and duration of operations performed by the first potential storage system, a timestamp that details uses of the volumes (read and/or write requests), etc. In some other approaches, the performance metrics include input/output operations per second (IOPS), e.g., such as for read and/or write operations performed on a volume of the volume group. Bandwidth (BW) associated with read and/or write operations performed on the volumes of the volume group is another performance metric that may be additionally and/or alternatively obtained. In yet some further approaches, cache hit rates, e.g., for read and/or write operations performed on the volumes of the volume group are another performance metric that may be additionally and/or alternatively obtained.

Intervals of sampling in which the performance metrics are obtained may be dynamically set, or alternatively, may be fixed. In some approaches, the performance metrics are obtained over the course of predetermined sampling periods of time, e.g., five minutes, ten minutes, ten seconds, etc. This way, changes of performance over time may be recorded in the performance metrics.

In some approaches, for one or more selected volume groups, e.g., a first volume group, predetermined types of the same performance metrics, e.g., the IOPS, the BW, etc., for the volumes of the volume group are added from the obtained performance metrics. Note that the volume group includes a subset of the volumes on a source storage system, e.g., such as the first potential target storage system. More specifically, for each potential target storage system in a customer's system pool, the placement of the volume group may, in some approaches, be simulated by adding the performance metrics, e.g., the sum of the IOPS for each of the volumes of the volume group are added with the IOPS of the first potential target storage system over a period of time that the simulation is performed. In preferred approaches, this adding includes adding performance metrics of the volume group with the same type of performance metrics of the potential target storage system, e.g., the first potential target storage system. The adding may be performed by plotting performance metrics of the volume group against performance metrics of the potential target storage system, in some approaches. The sum value(s) of the performance metrics provides the simulated placement. In some other approaches, points along the sampling period of the volume groups may be compared and paired with points along a previous operational period of the potential target storage system.

It should be noted that, in some approaches, only some of the performance metrics may be considered additive performance metrics, e.g., namely the IOPS and the BW performance metrics. In other words, some of the other performance metrics may not be considered additive, e.g., timestamps are not necessarily additive metrics that are able to be compared with one over a sampling period.

A filter may, in some approaches, be applied to remove outliers of the performance metric data of the sampling, e.g., additive data performance metric points that do not have at least a predetermined degree of similarity with a majority of the other additive data performance metric points. Such a filter may be of a type that would become apparent to one of ordinary skill in the art after reading the descriptions herein. This way, only qualifying performance metric entries, e.g. points, are captured within a sampling period and/or across a plurality of sampling periods (such as each day). The filter is, in some approaches, a function that is configurable and currently set to capture a predetermined percentile of a performance metric over a predetermined period of the simulation, e.g., the 95th percentile of IOPS each day. For context, the filtering is performed, in some approaches, to prevent extraneous points from changing an overall characteristic of the performance metrics in a result of the simulated placement.

In some preferred approaches, results of the simulated placement include a time series of performance metrics for the simulated placement (one per target system). The performance metrics of the results of the simulated placement preferably include IOPS and BW. The time series of the performance metrics is preferably generated with respect to a period of time that the simulated placement is made. For example, in some approaches, results of the simulated placement may include a six month time series of performance metrics for the simulated placement (one per target system). More specifically, in some approaches, the time series of performance metrics for the simulated placement may include one or more line graphs having a time-based x-axis, and a performance metric-based y-axis.

Operation 304 includes determining a first performance limit for the first potential target storage system based on the results of the simulating (for the simulated placement). For context, because the placement is only simulated, e.g., an actual placement of the volume group on the first potential target storage system is not (at least yet) performed in the data storage environment during the simulating, in order to determine the first performance limit for the first potential target storage system, in some approaches, results of the simulating (the time-series of the simulated placement over a predetermined period of time) may be used to generate one or more I/O profiles that characterize the simulated placement. Accordingly, in some approaches, method 300 includes causing a first I/O profile to be determined from the time-series of the simulated placement. In some other approaches, method 300 includes causing a plurality of I/O profiles to be determined from the time-series of the simulated placement (where each I/O profile is based on a different combination of the performance metrics).

In some preferred approaches, a generated I/O profile may include one or more of the types of performance metrics discussed elsewhere above, where the performance metrics are averaged across a lifespan of the time series. A given potential target storage system, e.g., such as the first potential target storage, may exhibit multiple I/O profiles. More specifically, each of these different I/O profiles may be based on different comparisons of the performance metrics. In some approaches, a first I/O profile for the simulated placement of the volume group on the first potential target storage system is based on an I/O record size of the volume group for the simulated placement. The I/O record size of the volume group for the simulated placement is preferably determined by dividing the BW (of the time series) by the IOPS (of the time series). A second I/O profile for the simulated placement of the volume group on the first potential target storage system may, in some approaches, be based on a read/write ratio of the volume group for the simulated placement. The read/write ratio of the volume group for the simulated placement is preferably determined by dividing the read IOPS (of the time series) by the write IOPS (of the time series). A third I/O profile for the simulated placement of the volume group on the first potential target storage system may, in some approaches, is the cache hit rate of the target system used for the simulated placement, e.g., the first potential target storage system.

In order to cause the plurality of I/O profiles to be determined, in some approaches, method 300 includes instructing an artificial intelligence (AI) engine to perform use a predetermined type of clustering algorithm to identify the plurality of I/O profiles. In at least some of these approaches, the AI engine uses a K-means clustering algorithm to identify the multiple profiles such that a standard deviation (stddev) of each cluster is less than a predetermined threshold value, e.g., the stddev of each cluster is <0.2.

In some preferred approaches, method 300 includes obtaining and/or using one or more benchmarks (of a performance benchmark suite that includes a plurality of potential performance benchmarks) to determine the performance limit of the simulated placement. The benchmark(s) may be obtained by, e.g., being accessed in a database, being received from a customer device, being provided by an administrator, etc. For context, a performance benchmark provides relation of IOPS and RT (response time) for different permutations of configuration parameters, e.g., a flash-based potential target storage system, a number of disks on a potential target storage system, a number of ports on a potential target storage system, etc., and performance parameters, e.g., cache hit ratio, read/write ratio, record size, etc. More specifically, each benchmark indicates past behavior of a potential target storage system over a period of time.

For example, in some approaches, each benchmark may contrast two or more performance metrics with one another, e.g., IOPS vs latency. As will now be described below, by relating the generated first I/O profile to one of the benchmarks, information of the benchmark may be used to determine the first performance limit for the first potential target storage system.

In some approaches, method 300 includes selecting one or more benchmarks, from a plurality of received benchmarks, to use for comparing with the first I/O profile. For context, one or more benchmarks selected for using for the comparison preferably have at least some configuration parameters that match and/or are similar (within a predetermined threshold degree of similarity) with configuration parameters of the first I/O profile. Accordingly, in some approaches, in order to identify a subset of the benchmarks to compare with the first I/O profile, the first potential target storage system's model, number of disks, number of ports, etc., may be considered to identify a corresponding set of benchmarks (a subset of the obtained plurality of benchmarks) that may be referred to in order to identify the performance limit of the first potential target storage system. In some approaches, each set of benchmarks may include a plurality of performance metric trends for different distinct I/O profiles, e.g., such as 30 IOPS vs. latency trends for distinct I/O profiles.

A first benchmark may be selected from the plurality of benchmarks, e.g., in some approaches determined from the subset of benchmarks determined above. For context, the first benchmark is one of the plurality of received benchmarks determined to have a relatively closest correlation with the first I/O profile.

In order to select the first benchmark from the subset of the benchmarks, in some approaches, method 300 includes selecting the relatively nearest benchmark according to the Euclidian distance between the benchmark's and the simulated placement's I/O profiles, e.g., such as the first I/O profile. For at least some approaches in which the first potential target storage system exhibits multiple I/O profiles, multiple benchmarks are preferably selected, e.g., one per-profile, to calculate multiple limits. From the multiple limited that are calculated, a relatively most conservative limit may be determined (e.g., a lower of two IOPS limits) and used to calculate the headroom.

In some other approaches, the first benchmark may be selected by comparing a line graph that details the performance metrics of the first I/O profile over a predetermined amount of time with a line graph that details the performance metrics of a given one of the benchmarks over the predetermined amount of time. In some preferred approaches, the performance metrics of the first I/O profile is compared with a plurality of the benchmarks, and the first benchmark is one of the plurality of received benchmarks determined to have a relatively closest line graph correlation with a line associated with the first I/O profile, e.g., such as a relatively closest line correlation within the compared line graphs.

The benchmark may then be used to determine the first performance limit for the first potential target storage system based on the simulating. For example, relative limits of one or more of the performance metrics may be identified in a line graph of the first benchmark. More specifically, the maximum observed performance (performance limit) may, in some approaches, be determined with respect to a predetermined one or more predetermined parameters, e.g., preferably IOPS. For example, in some approaches, the first performance limit may be determined based on IOPS, where the performance limit is the x-axis in the available benchmarks. The first performance limit may, in some approaches, be a maximum IOPS of the line graph of the first benchmark.

Operation 306 includes predicting a duration the first potential target storage system can host the volume group without performance degradation. The predicting, in some approaches, includes using the selected first benchmark, and more specifically, the first performance limit, to predict (project) performance metrics (preferable IOPS) for the simulated placement over a predetermined amount of time in the future. Techniques for performing this prediction, in some approaches, includes projecting the performance metrics of the simulated placement for a duration of future time using linear regression, such as, e.g., a period of time specified by a customer device. A difference between the projected performance metrics and the performance metrics of the first performance limit determined above may be calculated to determine an available headroom, e.g., a predicted amount of headroom that the first potential target storage system would have in the event that the volume group were actually placed on the first potential target storage system. According to a relatively more specific approach, with respect to the IOPS performance metric, the available headroom may be determined as a difference between the projected IOPS and the IOPS of the first performance limit. The available headroom may be determined over time and may be used to determine when a performance degradation would occur. For example, in some approaches, the duration the first potential target storage system can host the volume group without performance degradation may begin at a time that the volume group is placed on the first potential target storage system and end at a determined time that the placement results in less than a predetermined amount of available headroom exists for the first potential target storage system. In other words, the performance degradation occurs upon less than the predetermined amount of available headroom existing for the first potential target storage system as a result of the placement.

Operation 308 includes outputting a notification to a customer device, where the notification includes an indication of the predicted duration. The customer device may be any computing device. The customer device may, in some approaches, be associated with an owner of the volume group. In some other approaches, the customer device is configured to control the placement of the volume group on different potential target storage systems (including the first potential target storage system) in the data storage environment.

Although various approaches described above detail a simulated placement of a volume group on a single potential target storage system, i.e., the first potential target storage system, in some approaches, operation(s) of method 300 may be performed with respect to a plurality of potential target storage systems ( ) in order to determine a relatively best suited placement for the volume group. For example, method 300 may include simulating placement of a volume group on a plurality of potential target storage systems using similar techniques to those described elsewhere above with respect to the first potential target storage system. Then, based on the simulations, performance limits from a plurality of potential target storage systems may be compared. Note that, the performance limits may include the first performance limit for approaches in which the plurality of potential target storage systems includes the first plurality of potential target storage system.

In some approaches, method 300 includes deploying the volume group to one of the potential target storage system, e.g., actually migrating the volume group to a determined one of the potential target storage systems for enabling the determined potential target storage system to fulfill read and/or write operations for the volume group for a duration of the actual placement. In some approaches, the volume group is deployed to the potential target storage system determined to have a relatively highest performance limit. The determined performance limits may be used in a ranking process (described below) used for determining which of the potential target storage systems to deploy the volume group to.

In some approaches, the ranking process of method 300 includes ranking the target storage systems according to available headroom, e.g., IOPS headroom, where the target storage system with the relatively greatest amount of available headroom is the top recommendation. More specifically, determining the potential target storage system having the relatively highest performance limit, in some approaches, includes ranking each of the potential target storage systems with respect to an amount of headroom (a maximum amount of headroom) predicted to be available on the potential target storage system over a predetermined amount of time in the future, e.g., after six months. In one or more of such approaches, the potential target storage system determined to have a relatively highest performance limit is determined as the storage target having a relatively greatest headroom ranking. In some other approaches, the ranking may depend on the longest duration the volume group can be hosted without reaching the pre-defined headroom (rather than highest performance limit).

Figure 4:
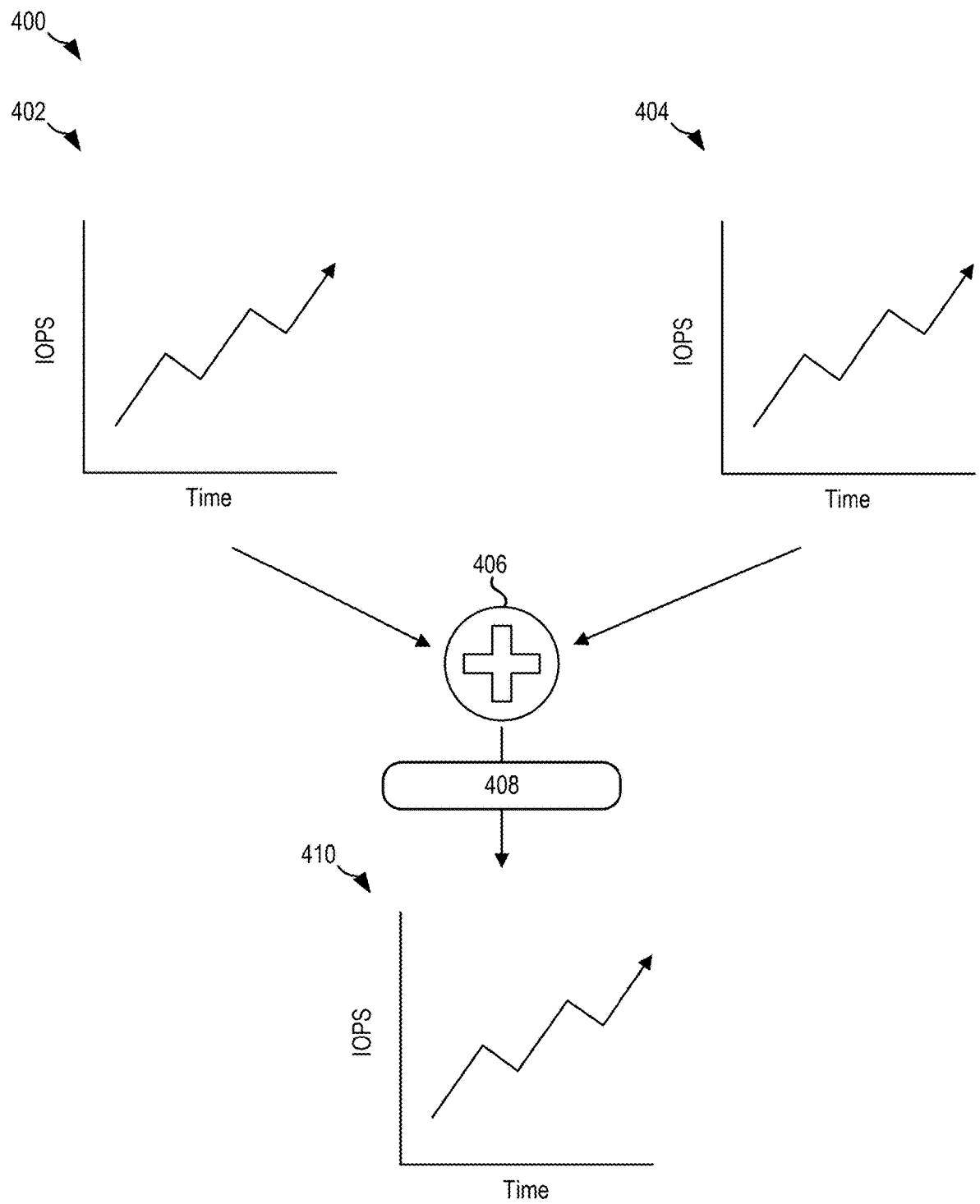
FIG. 4 depicts a logical decision path, in accordance with one embodiment of the present invention.

FIG. 4 depicts a logical decision path 400, in accordance with one embodiment. As an option, the present logical decision path 400 may be implemented in conjunction with features from any other embodiment listed herein, such as those described with reference to the other FIGS. Of course, however, such logical decision path 400 and others presented herein may be used in various applications and/or in permutations which may or may not be specifically described in the illustrative embodiments listed herein. Further, the logical decision path 400 presented herein may be used in any desired environment.

The logical decision path 400 includes a first line graph 402 that plots IOPS over time for a first volume group, and a second line graph 404 that plots IOPS over time for a total storage system. During a simulated placement of the first volume group on the total storage system. Because IOPS may be considered an additive performance metric, the IOPS of the line graphs 402 and 404 may be added, e.g., see additive operation 406. A filter may, in some approaches, be applied to remove outliers of the performance metric data, e.g., see operation 408. For example, in some approaches, the filter is a function that is applied to capture a predetermined percentile of IOPS over a predetermined period of the simulation, e.g., the $95^{th}$ percentile of IOPS each day. For context, the filtering is performed, in some approaches, to prevent extraneous points from changing an overall characteristic of the performance metrics in a result of the simulated placement. A third line graph 410 may be generated that represents the simulated placement, e.g., see IOPS over time.

Figure 5:
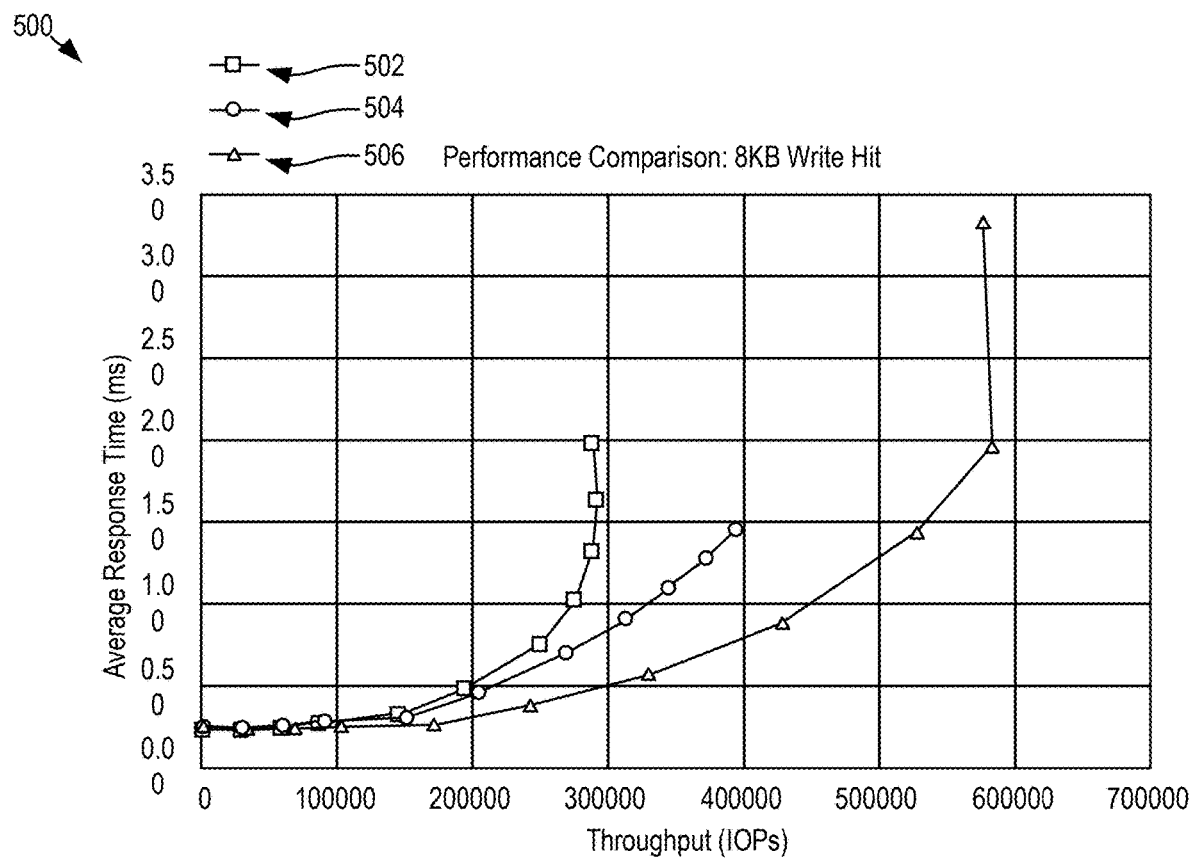
FIG. 5 depicts a line graph, in accordance with one embodiment of the present invention.

FIG. 5 depicts a line graph 500, in accordance with one embodiment. As an option, the present line graph 500 may be implemented in conjunction with features from any other embodiment listed herein, such as those described with reference to the other FIGS. Of course, however, such line graph 500 and others presented herein may be used in various applications and/or in permutations which may or may not be specifically described in the illustrative embodiments listed herein. Further, the line graph 500 presented herein may be used in any desired environment.

The line graph 500 includes three different lines that each detail a different performance benchmark with respect to performance metrics including IOPS and average response time for different permutations of configuration parameters, e.g., see a first line 502 representative of a first performance benchmark, a second line 504 representative of a second performance benchmark, and a third line 506 representative of a third performance benchmark. One of these benchmarks may be selected using the techniques described in method 300, and the selected benchmark may be used to predict performance metrics (such as IOPS) for a simulated placement over a predetermined amount of time in the future.

Figure 6:
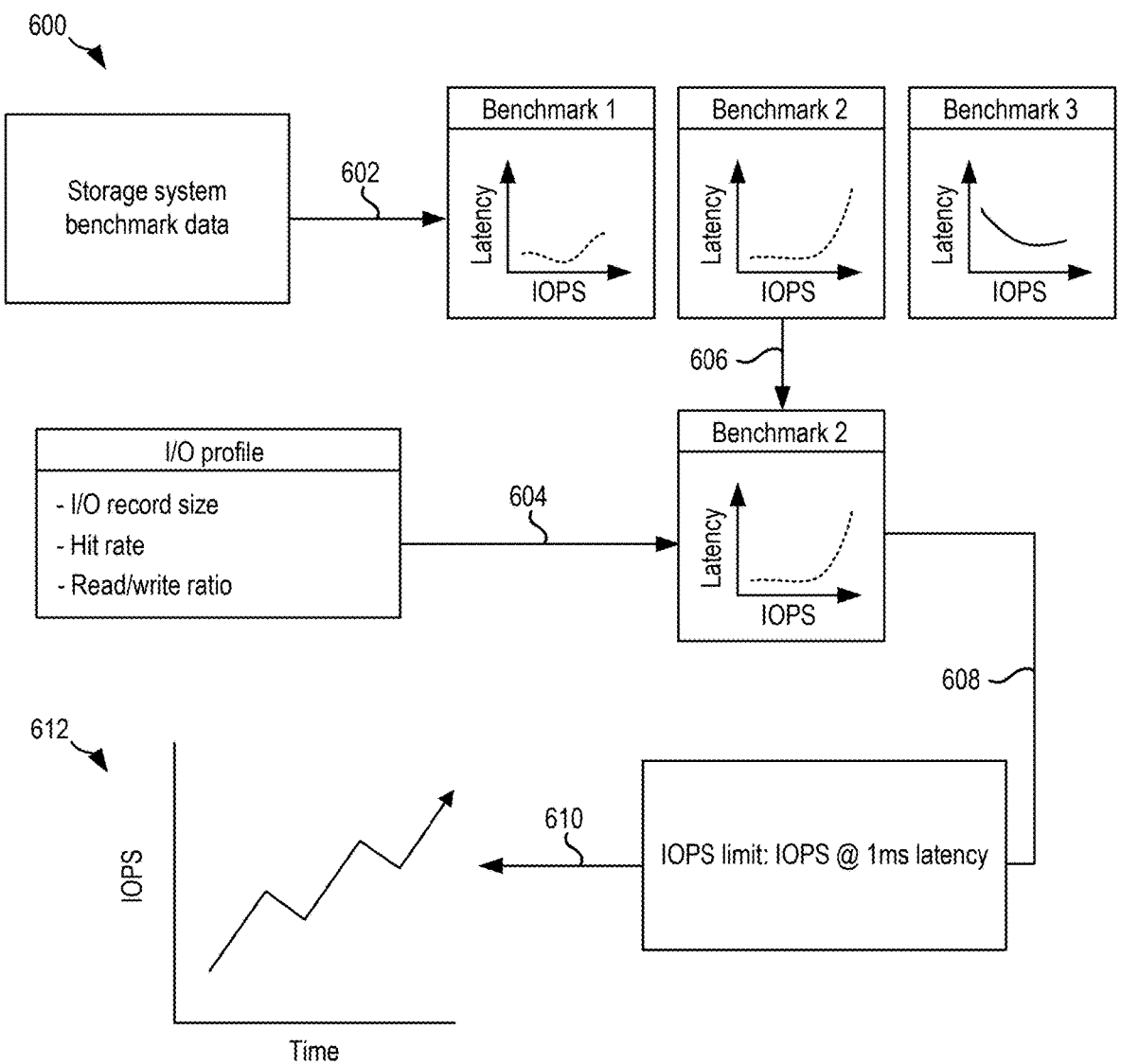
FIG. 6 is a flowchart of a method, in accordance with one embodiment of the present invention.

Now referring to FIG. 6, a flowchart of a method 600 is shown according to one embodiment. The method 600 may be performed in accordance with aspects of the present invention in any of the environments depicted in FIGS. 1-6, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that FIG. 6 includes some steps described elsewhere herein in method 300. More specifically, method 600 details operations for finding an IOPS limit for a storage system with a given placement and operations for projecting IOPS over a predetermined amount of time in the future, e.g., three to twelve months in the future.

Operation 602 includes obtaining a plurality of benchmarks, e.g., see Benchmark 1, Benchmark 2, and Benchmark 3, from a predetermined database, e.g., see Storage system benchmark data. A determined I/O profile is compared with the benchmarks, e.g., see operation 604, and a benchmark determined to have a relatively closest correlation with the I/O profile is selected, e.g., see operation 606 that identifies Benchmark 2.

In some approaches, a duration a potential target storage system can host a volume group without performance degradation (before a performance limit is reached) is predicted, e.g., see operation 608 and IOPS limit: IOPS @ 1 millisecond (ms) of latency, based on the first performance limit Selected Benchmark 2 is then used to predict performance metrics (preferably IOPS) for a simulated placement of a volume group over a predetermined amount of time in the future, e.g., see operation 610. These predict performance metrics are illustrated in the graph 612 which illustrates projected IOPS over time for the simulated placement.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:
   simulating placement of a volume group on a first potential target storage system, the volume group comprising a collection at least one physical volume of data;
   filtering results of the simulated placement to remove outlier data;
   determining, from the filtered results of the simulated placement, a first performance limit for the first potential target storage system;
   predicting a duration the first potential target storage system can host the volume group without performance degradation, based on the first performance limit; and
   outputting a notification to a customer device, wherein the notification includes an indication of the predicted duration.

2. The CIM of claim 1, comprising:
   comparing performance limits obtained from a plurality of potential target storage systems,
   wherein the performance limits include the first performance limit,
   wherein the performance limits are obtained from the potential target storage systems as a result of the potential target storage systems being instructed to generate the performance limits,
   wherein the plurality of potential target storage systems includes the first potential target storage system; and
   deploying the volume group to the potential target storage system determined to have a relatively highest performance limit.

3. The CIM of claim 2, comprising:
   determining the potential target storage system having the relatively highest performance limit,
   wherein determining the potential target storage system having the relatively highest performance limit includes: ranking each of the potential target storage systems with respect to an amount of headroom predicted to be available on the potential target storage system over a predetermined amount of time in the future,
   wherein the headroom predicted to be available on a first of the potential target storage systems over the predetermined amount of time in the future is determined as a difference between input/output operations per second (IOPS) projected to be available on the first potential target storage system over a predetermined period of time and IOPS of the first performance limit, wherein the potential target storage system determined to have the relatively highest performance limit is determined as the storage target having a relatively greatest headroom ranking.

4. The CIM of claim 1, wherein results of the simulating are used for determining the first performance limit, wherein the results of the simulating include a time-series of the simulated placement over a predetermined period of time.

5. The CIM of claim 4, comprising:
causing a first I/O profile to be determined from the time-series of the simulated placement; and
selecting a first benchmark from a plurality of received benchmarks,
wherein the first benchmark is one of the plurality of received benchmarks determined to have a relatively closest correlation with the first I/O profile.

6. The CIM of claim 5, wherein the predicting includes using the selected first benchmark to predict performance metrics for the simulated placement over a predetermined amount of time in the future, wherein the predicted performance metrics comprise cache hit rates for read and/or write operations performed on the at least one physical volume of data of the volume group.

7. The CIM of claim 4, comprising:
causing a plurality of I/O profiles to be determined from the time-series of the simulated placement,
wherein causing the plurality of I/O profiles to be determined includes: causing a predetermined type of clustering algorithm to identify the plurality of I/O profiles.

8. The CIM of claim 1, wherein the first performance limit is determined based on input/output operations per second (IOPS).

9. The CIM of claim 1, wherein results of the simulated placement include a time series of performance metrics for the simulated placement, wherein the performance metrics are input/output operations per second (IOPS), and bandwidth (BW).

10. A computer program product (CPP), the CPP comprising:
a set of one or more computer-readable storage media; and
program instructions, collectively stored in the set of one or more storage media, for causing a processor set to perform the following computer operations:
simulate placement of a volume group on a first potential target storage system, the volume group comprising a collection at least one physical volume of data;
filter results of the simulated placement to remove outlier data;
determine, from the filtered results of the simulated placement, a first performance limit for the first potential target storage system;
predict a duration the first potential target storage system can host the volume group without performance degradation, based on the first performance limit; and
output a notification to a customer device, wherein the notification includes an indication of the predicted duration.

11. The CPP of claim 10, the CPP comprising:
program instructions, collectively stored in the set of one or more storage media, for causing the processor set to perform the following computer operations:
compare performance limits obtained from a plurality of potential target storage systems,
wherein the performance limits include the first performance limit,
wherein the performance limits are obtained from the potential target storage systems as a result of the potential target storage systems being instructed to generate the performance limits,
wherein the plurality of potential target storage systems includes the first potential target storage system; and
deploy the volume group to the potential target storage system determined to have a relatively highest performance limit.

12. The CPP of claim 11, the CPP comprising:
program instructions, collectively stored in the set of one or more storage media, for causing the processor set to perform the following computer operations:
determine the potential target storage system having the relatively highest performance limit,
wherein determining the potential target storage system having the relatively highest performance limit includes: ranking each of the potential target storage systems with respect to an amount of headroom predicted to be available on the potential target storage system over a predetermined amount of time in the future,
wherein the headroom predicted to be available on a first of the potential target storage systems over the predetermined amount of time in the future is determined as a difference between input/output operations per second (IOPS) projected to be available on the first potential target storage system over a predetermined period of time and IOPS of the first performance limit,
wherein the potential target storage system determined to have the relatively highest performance limit is determined as the storage target having a relatively greatest headroom ranking.

13. The CPP of claim 10, wherein results of the simulating are used for determining the first performance limit, wherein the results of the simulating include a time-series of the simulated placement over a predetermined period of time.

14. The CPP of claim 13, the CPP comprising: program instructions, collectively stored in the set of one or more storage media, for causing the processor set to perform the following computer operations:
cause a first I/O profile to be determined from the time-series of the simulated placement; and
select a first benchmark from a plurality of received benchmarks,
wherein the first benchmark is one of the plurality of received benchmarks determined to have a relatively closest correlation with the first I/O profile.

15. The CPP of claim 14, wherein the predicting includes using the selected first benchmark to predict performance metrics for the simulated placement over a predetermined amount of time in the future, wherein the predicted performance metrics comprise cache hit rates for read and/or write operations performed on the at least one physical volume of data of the volume group.

16. The CPP of claim 13, the CPP comprising: program instructions, collectively stored in the set of one or more storage media, for causing the processor set to perform the following computer operations:
cause a plurality of I/O profiles to be determined from the time-series of the simulated placement,
wherein causing the plurality of I/O profiles to be determined includes: causing a predetermined type of clustering algorithm to identify the plurality of I/O profiles.

17. The CPP of claim 10, wherein the first performance limit is determined based on input/output operations per second (IOPS).

18. The CPP of claim 10, wherein results of the simulated placement include a time series of performance metrics for the simulated placement, wherein the performance metrics are input/output operations per second (IOPS), and bandwidth (BW).

19. A computer system (CS), the CS comprising:
a processor set;
a set of one or more computer-readable storage media; and
program instructions, collectively stored in the set of one or more storage media, for causing the processor set to perform the following computer operations:
simulate placement of a volume group on a first potential target storage system, the volume group comprising a collection at least one physical volume of data;
filter results of the simulated placement to remove outlier data;
determine, from the filtered results of the simulated placement, a first performance limit for the first potential target storage system;
predict a duration the first potential target storage system can host the volume group without performance degradation, based on the first performance limit; and
output a notification to a customer device, wherein the notification includes an indication of the predicted duration.

20. The CS of claim 19, the CS comprising: program instructions, collectively stored in the set of one or more storage media, for causing the processor set to perform the following computer operations:
compare performance limits obtained from a plurality of potential target storage systems,
wherein the performance limits include the first performance limit,
wherein the performance limits are obtained from the potential target storage systems as a result of the potential target storage systems being instructed to generate the performance limits,
wherein the plurality of potential target storage systems includes the first potential target storage system; and
deploy the volume group to the potential target storage system determined to have a relatively highest performance limit.

\* \* \* \* \*